(12) United States Patent
Campos et al.

(10) Patent No.: US 6,873,984 B1
(45) Date of Patent: Mar. 29, 2005

(54) DATA MINING RECOMMENDATION WEB BEANS AND JSP TAG LIBRARIES

(75) Inventors: Marcos M. Campos, Cambridge, MA (US); Mark Kelly, Needham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 424 days.

(21) Appl. No.: 10/077,965

(22) Filed: Feb. 20, 2002

(51) Int. Cl.$^7$ ............................................. G06F 17/30
(52) U.S. Cl. ........................................................ 707/6
(58) Field of Search ....................... 707/6, 3, 10, 104.1, 707/1; 705/14, 26, 52; 715/509

(56) References Cited

U.S. PATENT DOCUMENTS

| | | | |
|---|---|---|---|
| 6,529,909 B1 | * | 3/2003 | Bowman-Amuah .......... 707/10 |
| 6,718,515 B1 | * | 4/2004 | Conner et al. .............. 715/509 |
| 2001/0010046 A1 | * | 7/2001 | Muyres et al. ................ 705/52 |
| 2001/0056405 A1 | * | 12/2001 | Muyres et al. ................ 705/52 |
| 2003/0187821 A1 | * | 10/2003 | Cotton et al. .................. 707/1 |

* cited by examiner

*Primary Examiner*—Diane D. Mizrahi
(74) *Attorney, Agent, or Firm*—Swidler Berlin LLP

(57) ABSTRACT

A method, system, and computer program product for providing data mining functionality into Web page design that provides improved ease of design without the need for extensive custom programming. The method comprises the steps of: transmitting to a browser operated by a user a Web page for display to the user, the Web page including a control for activating a data mining function, launching a servlet in response to an indication that the control has been activated, transmitting a request for data mining processing from the servlet to a data mining engine, receiving a result of the data mining processing from the data mining engine, and transmitting the result to the browser. The servlet may be a reusable software component. The servlet may be a JavaBean. The JavaBean may comprise a call to a Java Application Program Interface. Activation of the control may activate a Hypertext Markup Language tag. The result of the data mining processing may comprise hypertext markup language code generated by the data mining engine. The method may further comprise the step of generating Hypertext Markup Language code based on the received result of the data mining processing.

24 Claims, 8 Drawing Sheets

DATA MINING RECOMMENDATION WEB BEANS AND JSP TAG LIBRARIES

FIELD OF THE INVENTION

The present invention relates to a recommendation or data mining engine that generates recommendations that can be used to dynamically create web pages.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated based on one or more data analysis algorithms. Initially, the models are "untrained", but are "trained" by processing training data and generating information that defines the model. The generated information is then deployed for use in data mining, for example, by providing predictions of future behavior based on specific past behavior or recommendations for actions, such as purchases, based on past actions.

One potential application for data mining involves generating predictions/recommendations for user of the World Wide Web (Web) service of the Internet. A typical prior art arrangement of such an application is shown in FIG. 1. A user (not shown) interacts with browser software 102, such as a browser application program, running on a user computer system 103. Examples of such programs include MICROSOFT INTERNET EXPLORER® and NETSCAPE NAVIGATOR®. The user provides input to browser 104 via input routines 104 and receives output from browser 104 via display routines 106. A user may access a Web site, represented by Web pages displayed to the user by browser 102. The user may then provide input, typically by activating controls provided in the Web pages, to obtain functionality from the Web site. User input may be processed, then transmitted over the Internet 108 to a Web server 110. Web server 110 is typically a network server that handles requests for service from user computer systems, such as user computer system 103. Running on Web server 110 are one or more Web applications, such as Web application 112. In order to provide data mining functionality, Web server 110 is typically communicatively connected to a data mining engine, such as data mining engine 114. Web application 112 receives user input from user computer system 103 via the Internet and processes the input to provide the requisite functionality.

In order to provide data mining functionality, Web application 112 must access data mining system 114. Typically, Web application 112 interacts with data mining engine 114 through application program interface (API) calls, such calls using the Java API. To perform a particular data mining task, a Web site designer must generate custom code, such as Java code 115. Java code 115 then directly accepts user input 104 and generates Java API calls that are transmitted via Internet 108 and Web application 112 to data mining engine 114. Data mining engine 114 performs the requested data mining service and generates data mining results 116, such as predictions of future behavior or recommendations for actions. Data mining engine 114 transmits data mining results 116 to Web application 112. Web application 112 receives data mining results 116 and generates HyperText Markup Language (HTML) code 118, which is designed to display data mining results 116 in an appropriate format, etc. Web application 112 transmits HTML code 118 to browser 102 via the Internet 108. Browser 102 receives HTML code 118 and generates display 120 based on the received HTML code 118.

This arrangement provides the advantage of flexibility in the design of the Web site and the Web pages that make up the site. However, a problem arises in that the use of API calls to interface the Web application with the data mining engine requires the generation of custom code for each implementation of data mining functionality on each Web page that uses data mining. This makes it impossible for a Web site designer to incorporate data mining functionality into a Web page as an "out-of-the-box" component. A need arises for a technique by which data mining functionality can be incorporated into Web page design that provides improved ease of design without the need for extensive custom programming.

SUMMARY OF THE INVENTION

The present invention is a method, system, and computer program product for providing data mining functionality into Web page design that provides improved ease of design without the need for extensive custom programming.

The method for providing Internet data mining functionality, according to the present invention, comprises the steps of: transmitting to a browser operated by a user a Web page for display to the user, the Web page including a control for activating a data mining function, launching a servlet in response to an indication that the control has been activated, transmitting a request for data mining processing from the servlet to a data mining engine, receiving a result of the data mining processing from the data mining engine, and transmitting the result to the browser.

The servlet may be a reusable software component. The servlet may be a JavaBean. The JavaBean may comprise a call to a Java Application Program Interface. The servlet may be launched using a Java Server Pages tag. Activation of the control may activate a Hypertext Markup Language tag. The result of the data mining processing may comprise hypertext markup language code generated by the data mining engine. The method may further comprise the step of generating Hypertext Markup Language code based on the received result of the data mining processing.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
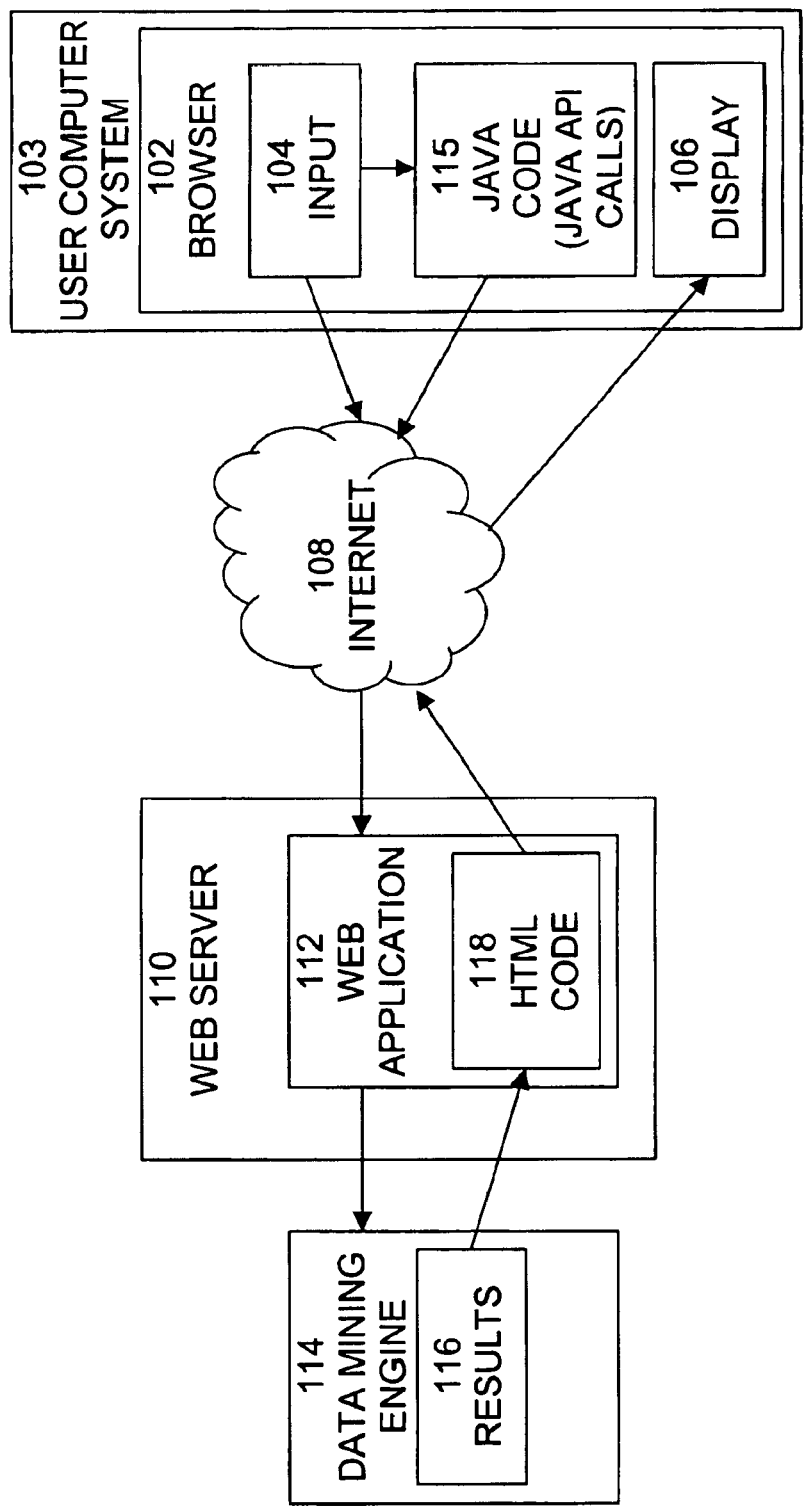
FIG. 1 is an exemplary block diagram of a prior art system.
Figure 2:
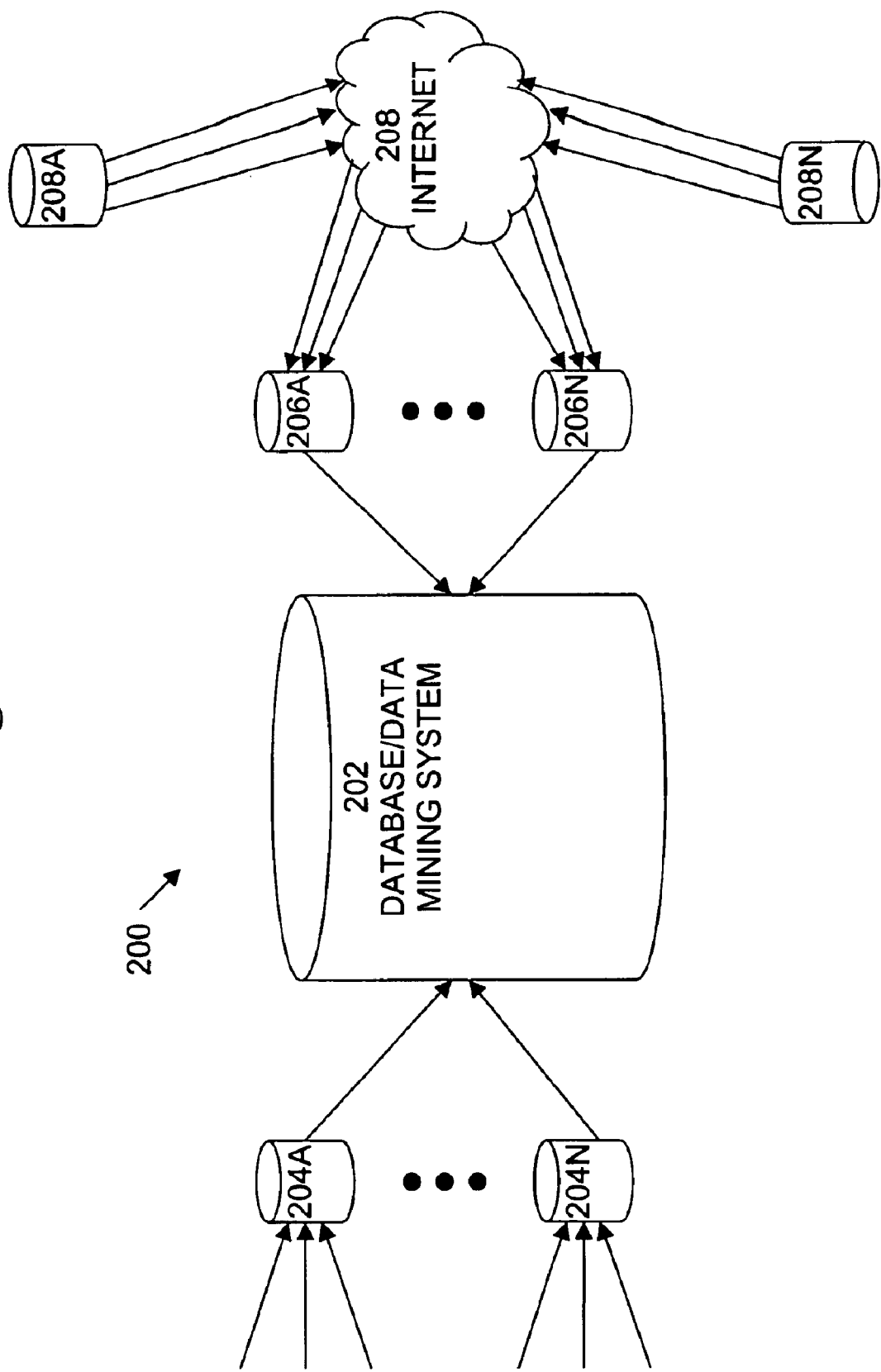
FIG. 2 is an exemplary block diagram of a data mining system, in which the present invention may be implemented.

An exemplary data mining system 200, in which the present invention may be implemented, is shown in FIG. 2. System 200 includes a database/data mining system 202 that is connected to a variety of sources of data. For example, system 202 may be connected to a plurality of internal or proprietary data sources, such as systems 204A–204N. Systems 204A–204N may be any type of data source, warehouse, or repository, including those that are not publicly accessible. Examples of such systems include inventory control systems, accounting systems, scheduling systems, etc. System 202 may also be connected to a plurality of proprietary data sources that are accessible in some way over the Internet 208. Such systems include systems 206A–206N, shown in FIG. 2. Systems 206A–206N may be publicly accessible over the Internet 208, they may be privately accessible using a secure connection technology, or they may be both publicly and privately accessible. System 202 may also be connected to other systems over the Internet 208. For example, system 210 may be privately accessible to system 202 over the Internet 208 using a secure connection, while system 212 may be publicly accessible over the Internet 208.

The common thread to the systems connected to system 202 is that the connected systems all are potential sources of data for system 202. The data involved may be of any type, from any original source, and in any format. System 202 has the capability to utilize and all such data that is available to it.

Figure 3:
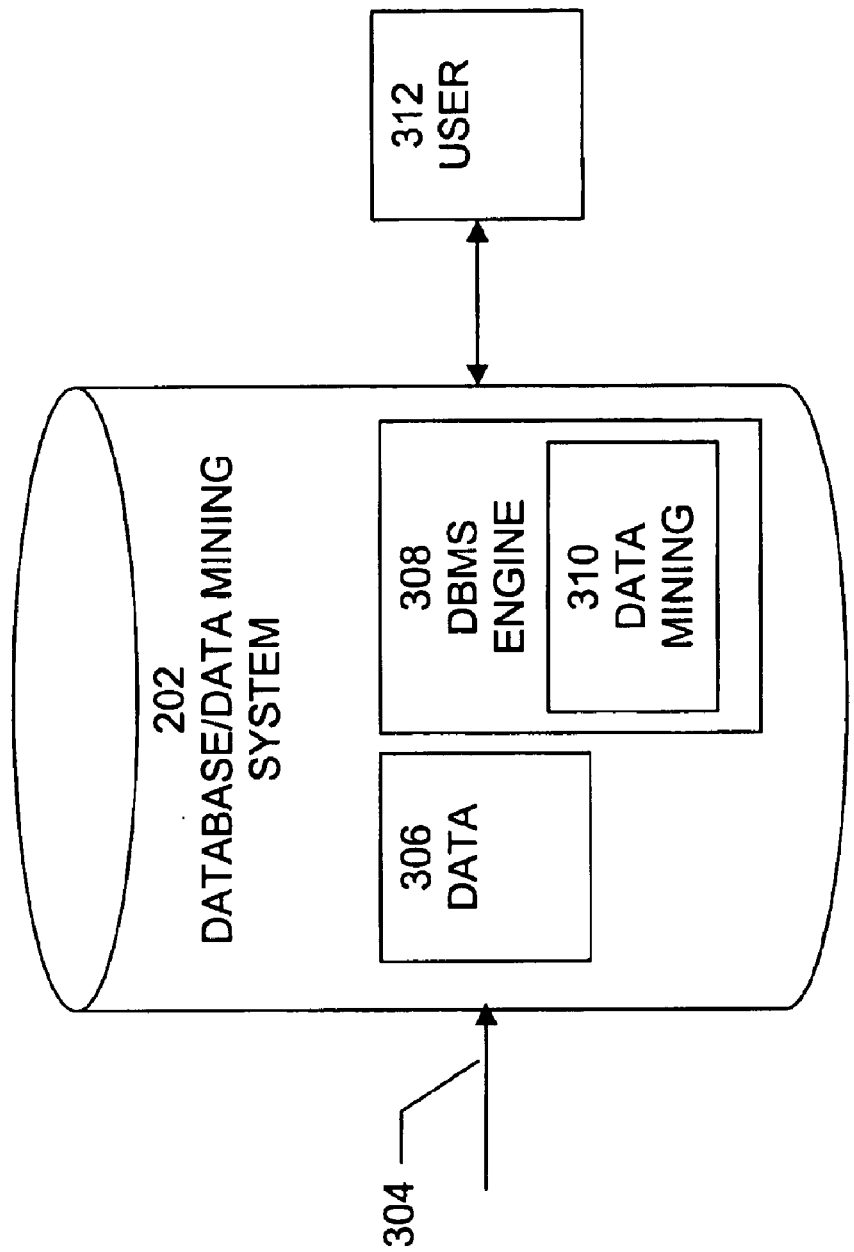
FIG. 3 is an exemplary block diagram of a database/data mining system shown in FIG. 1.

An exemplary embodiment of database/data mining system 202 is shown in FIG. 3. System 202 is a database management system that includes data mining functionality. Database management system 302 is connected to data sources 304, such as the proprietary and public data sources shown in FIG. 2. Database management system includes two main components, data 306, and database management system (DBMS) engine 308. Data 306 includes data, typically arranged as a plurality of data tables, such as relational data tables, as well as indexes and other structures that facilitate access to the data. DBMS engine 308 typically includes software that receives and processes queries of the database, obtains data satisfying the queries, and generates and transmits responses to the queries. DBMS engine 308 also includes data mining block 310, which provides DBMS engine 308 with the capability to obtain data and perform data mining processing on that data, so as to respond to requests for data mining processed data from one or more users, such as user 312.

Figure 4:
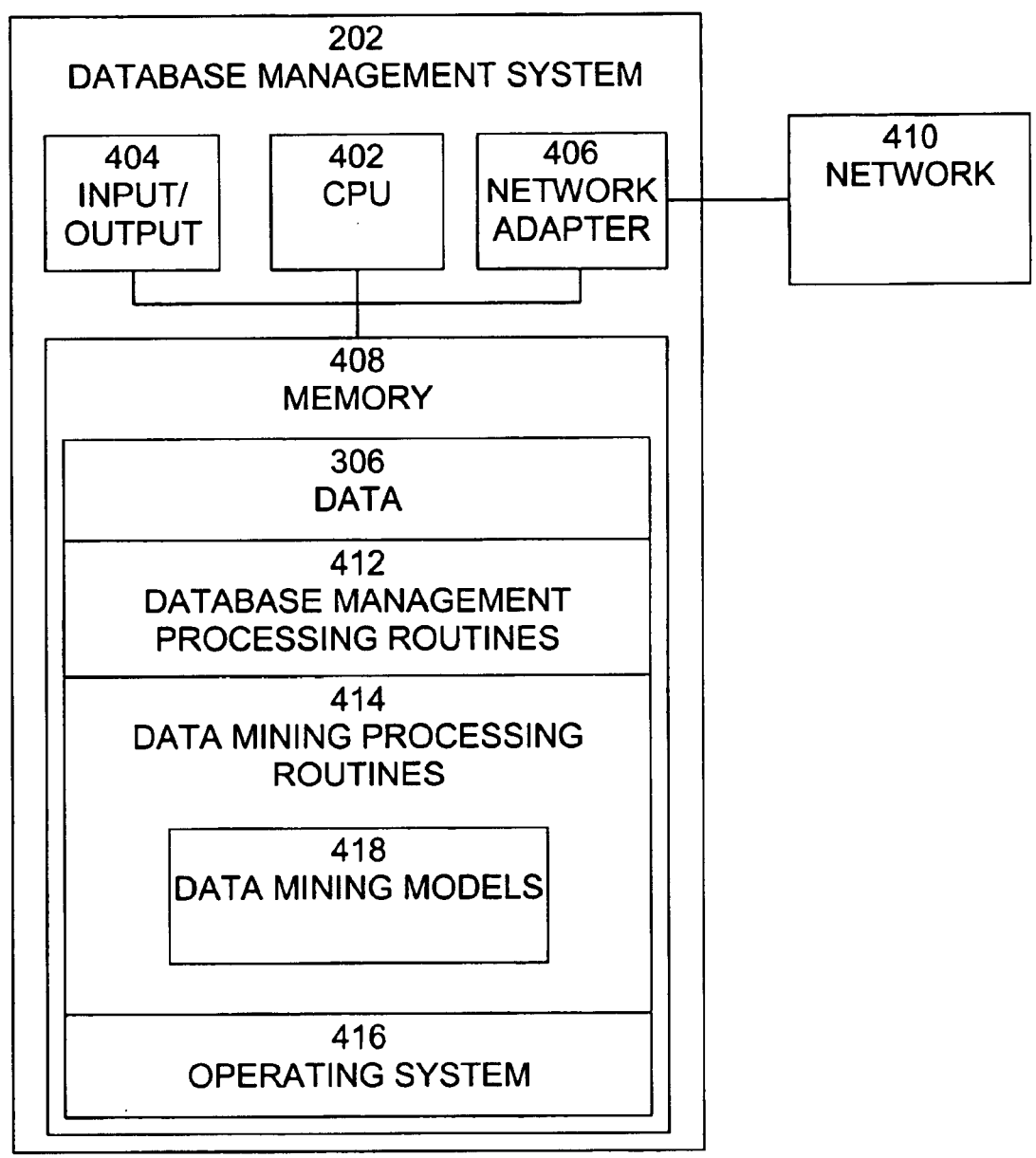
FIG. 4 is an exemplary block diagram of a database/data mining system 102 shown in FIG. 1.

An exemplary block diagram of a database/data mining system 202, shown in FIG. 2, is shown in FIG. 4. Database/data mining system 202 is typically a programmed general-purpose computer system, such as a personal computer, workstation, server system, and minicomputer or mainframe computer. Database/data mining system 202 includes processor (CPU) 402, input/output circuitry 404, network adapter 406, and memory 408. CPU 402 executes program instructions in order to carry out the functions of the present invention. Typically, CPU 402 is a microprocessor, such as an INTEL PENTIUM® processor, but may also be a minicomputer or mainframe computer processor. Input/output circuitry 404 provides the capability to input data to, or output data from, database/data mining system 202. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces database/data mining system 202 with network 410. Network 410 may be any standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of the database/data mining system 202. Memory 408 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 408 includes data 306, database management processing routines 412, data mining processing routines 414, and operating system 416. Data 306 includes data, typically arranged as a plurality of data tables, such as relational database tables, as well as indexes and other structures that facilitate access to the data. Database management processing routines 412 are software routines that provide database management functionality, such as database query processing. Data mining processing routines 414 are software routines that implement the data mining processing performed by the present invention. In particular, data mining processing routines 414 include data mining models 418, which provide the data mining fu nctionality of the present invention. Preferably, this data mining processing is integrated with database management processing. For example, data mining processing may be initiated by receipt of a database query, either in standard SQL or in the form of extended SQL statements. Operating system 420 provides overall system functionality.

Figure 5:
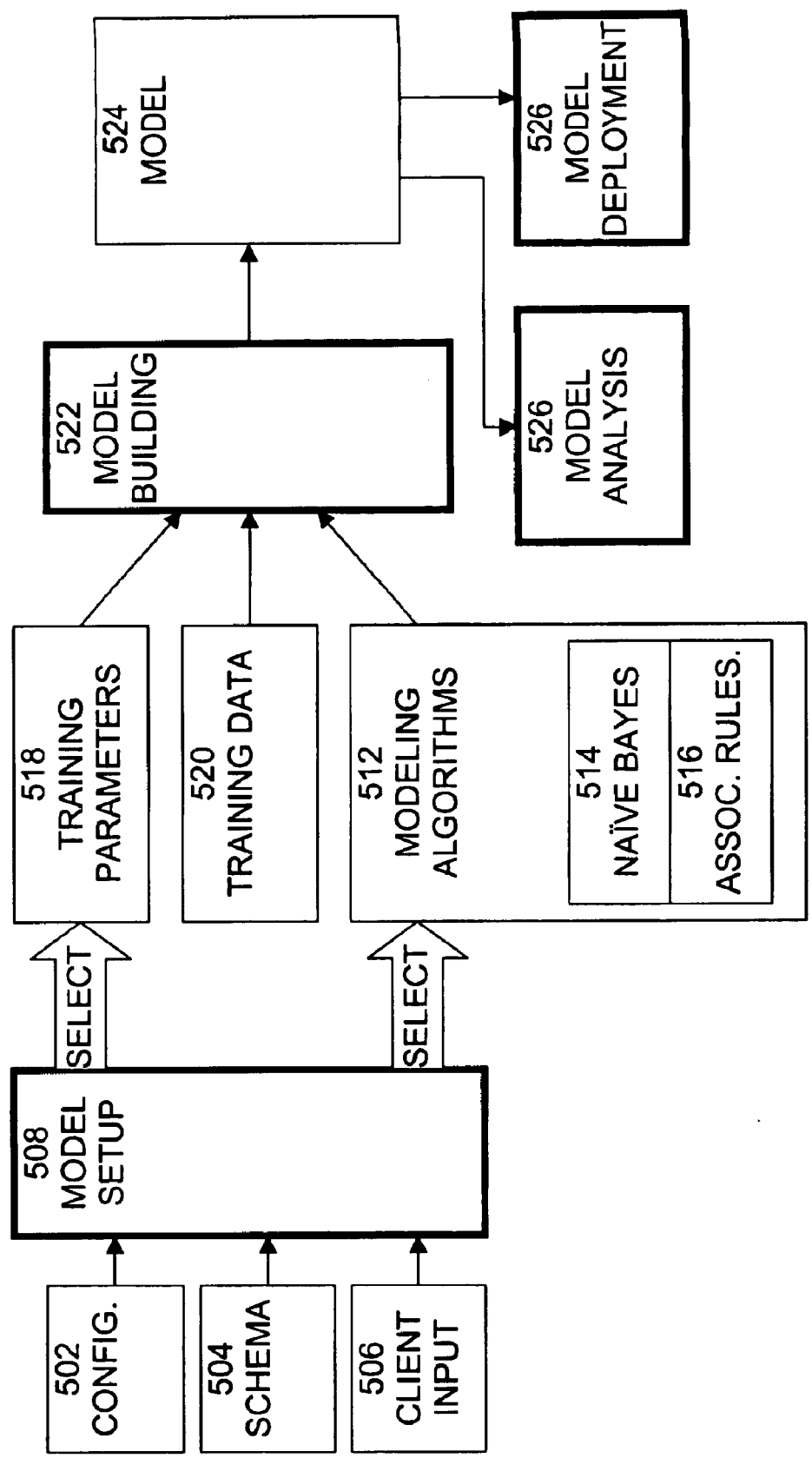
FIG. 5 is an exemplary data flow diagram of a data mining model building process performed by the data mining engine shown in FIG. 8.

An exemplary data flow diagram of a model building process, which may be performed by a data mining engine, is shown in FIG. 5. Model building involves building the models, such as classification and regression tree (CART) models, association rule models, self-organizing map (SOM) models, naïve-Bayes models, neural network models, k-means models, competitive learning models, etc., which are used to perform online recommendation and prediction. A configuration 502 defines the information, such as items, products, attributes, etc. that may of interest for the user in a particular universe. A schema 504 defines the types of models that are to be built in specific situations. Client input 506 includes information that allows the user to control the building of the data mining models. For example, client input 506 may include information specifying initial parameters to be used in a data mining model, a type of data mining model to be built, such as a self-organizing map, a k-means model, a competitive learning model, etc., and other parameters that are specific to the type of model selected. The configuration 502, the schema 504, and the client input 506 are input to model setup step 508, which sets up the models for training. In particular, model setup step 508 selects the modeling algorithms 512 that process the training data in order to actually build the models. For example, modeling algorithms 512 may include a naïve Bayes model algorithm 514, an association rules model algorithm 516, etc. The algorithms that are to be used to build models are selected by model setup step 504 based on the definitions in schema 504, as specified by the client input 506.

In addition, model setup step 508 generates and sets training parameters 518. Training parameters 518 are parameters that are input to the algorithms to control how the algorithms build the models. Training data 520 is data that is input to the algorithms that is used to actually build the models. Training parameters 518, the selected modeling algorithm, and training data 520 are input to model building block 522.

Model building block 522 invokes the selected modeling algorithm, initializes it using the training parameters 518, processes training data 520 using the modeling algorithm, and generates model 524. Model 524 includes a set of rules and/or representations that implement the conditions and decisions that make up an operational model. Model 524 may be input to model analysis block 526, which statistically analyzes the model to determine an indication of quality of the model, such as expected prediction accuracy. Model 524 is also output to model deployment block 528, which encodes the rules and/or representations of model 524 to an appropriate format and deploys the model for use for scoring data, such as in making predictions or recommendations.

Figure 6:
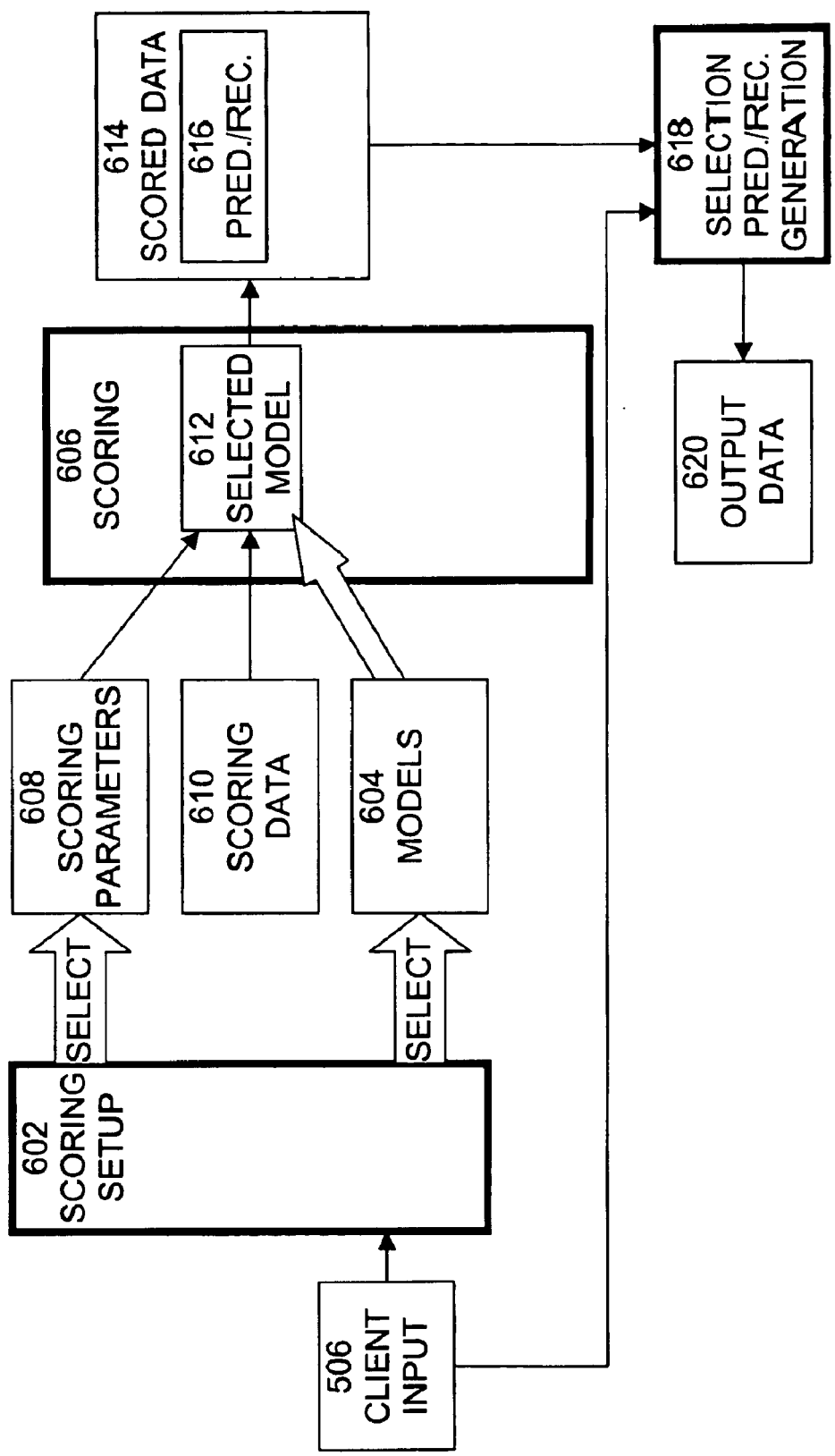
FIG. 6 is an exemplary data flow diagram of a data mining model scoring process performed by the data mining engine shown in FIG. 8.

An exemplary data flow diagram of a model scoring process is shown in FIG. 6. Client input 506 is input to scoring setup step 602. Client input 506 includes user data and desired results data. User data may, for example, include data relating to types of predications/recommendations desired by the user, data relating to constraints on the generated predication/recommendation desired by the user, or relating to specific actions the user is currently taking while browsing a Website. Desired results data may, for example, include definitions of the types of predictions and recommendations and constraints on the predictions and recommendations desired by the operator of the enterprise Web mining system. For example, user data may include information relating to items the user is purchasing and desired results data may indicate that the desired result is a recommendation for another product to be suggested to the user for purchase.

Scoring setup step 602 uses the input user data and desired results data to select models 606 and to select and generate scoring parameters 610. Models 604 include the model representations that were generated by model building block 522, shown in FIG. 5. Scoring setup step 602 selects a model for use in scoring step 606 based on the user data and on the desired results data included in client input 506. Scoring parameters 608 are parameters that are input to the scoring step 606 to control the scoring of scoring data 610 against the model and are input to the selection and prediction/recommendation process to control the selection of the scored results. Scoring setup step 602 selects and generate scoring parameters 608 for use in scoring step 606 based on the user data and on the desired results data included in client input 506.

The selected model 612, scoring parameters 608, and scoring data 610 are input to scoring step 606. In scoring step 606, scoring data 610 is processed according to selected model 612, as controlled by scoring parameters 608, to generate one or more scores for each scoring data record processed by model 612. A model 612 may, for example, be defined in terms of a function of input variables and a corresponding prediction/recommendation. The input scoring data 610 is input to the function defined by the model 612. The function is evaluated using the input scoring data 610 and scores are generated. The scored data 614 is output from scoring step 606 and includes the predictions/recommendations 616 for each scoring data record.

The scored data 614 is input to selection and prediction/recommendation generation step 618, which evaluates the scored data, such as predictions/recommendations 616, and selects those predictions/recommendations fitting the criteria specified by the scoring parameters 608. The selected records are those having scores meeting the selection criteria. The selection criteria may be defined by desired results data, such as scoring parameters 608, and/or by predefined or default criteria included in selection/generation step 618. In addition, the selection criteria may include a limit on the number of data records that are to be selected, or may indicate that the records are to be sorted based on their associated scores. The selected data records are output 620 from step 618 for further analysis or display.

Figure 7:
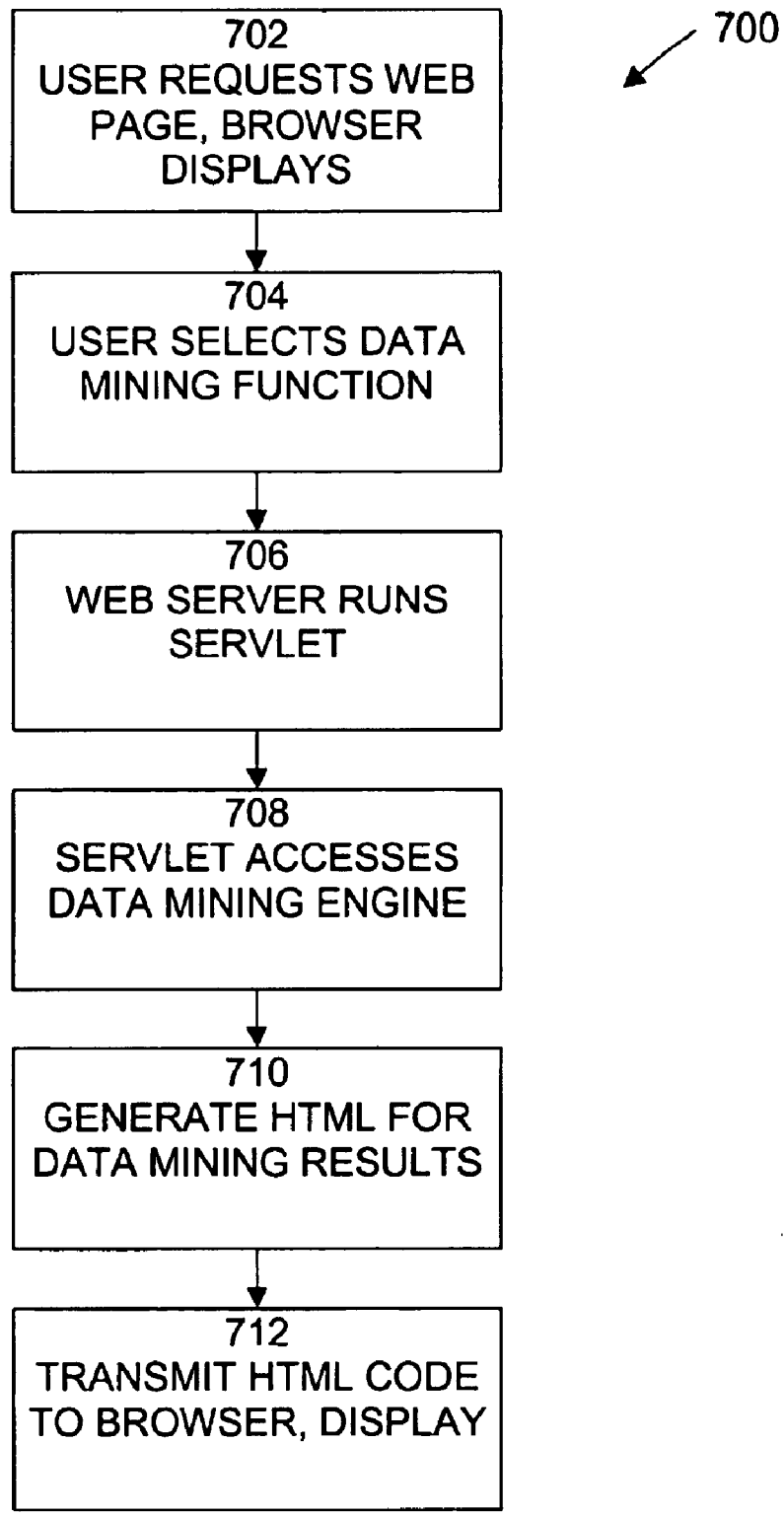
FIG. 7 is an exemplary flow diagram of a process, according to the present invention.
Figure 8:
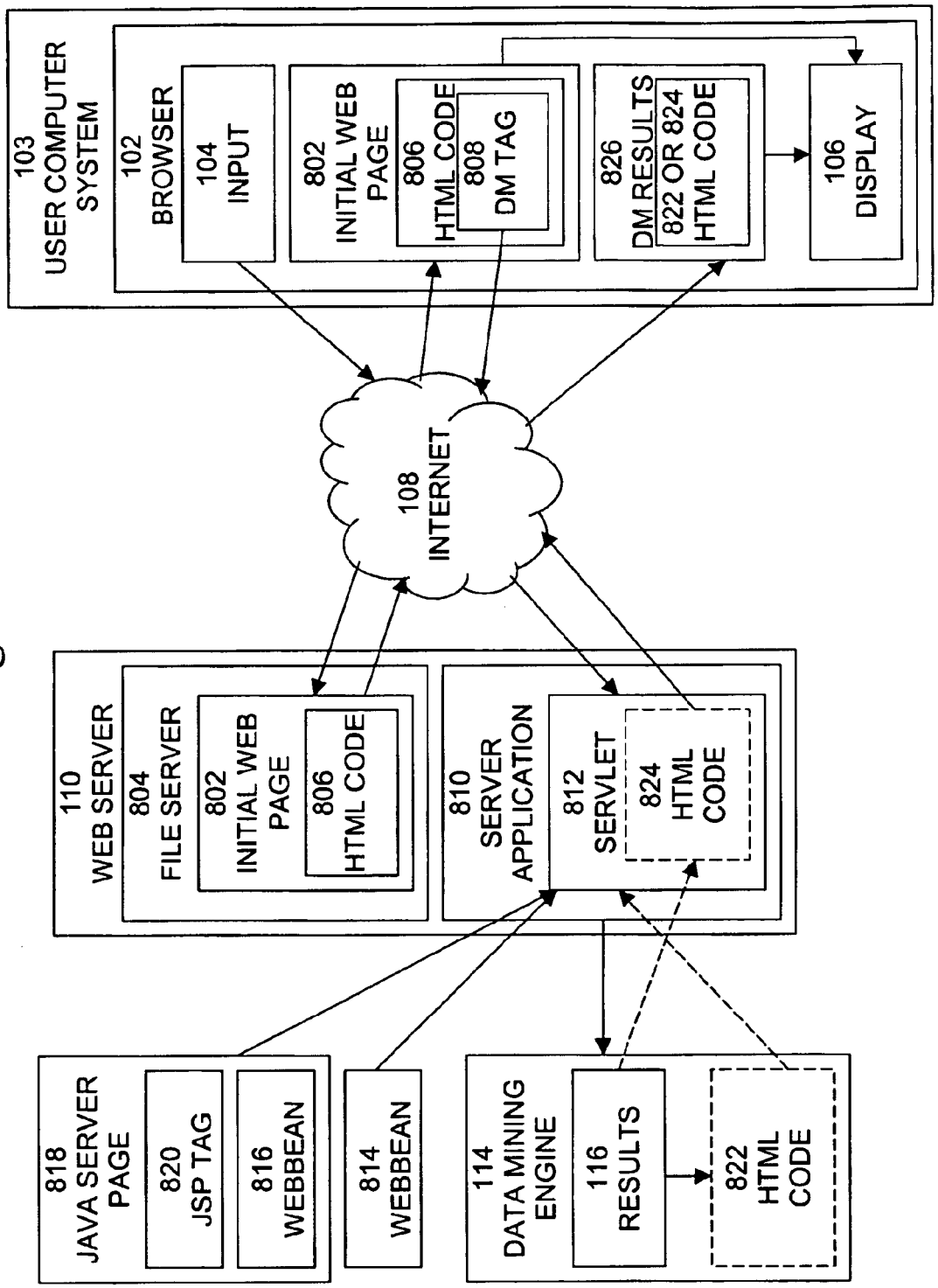
FIG. 8 is an exemplary data flow diagram of the process shown in FIG. 7.

An exemplary flow diagram of a process 700 of operation of the present invention is shown in FIG. 7. It is best viewed in conjunction with FIG. 8, which is a data flow diagram of data mining web beans, according to the present invention. Process 700 begins with step 702, in which a user requests an initial web page 802. User input selecting initial web page 802 is transmitted from browser 102 via the Internet 108 to file server 804, which is running on web server 110. File server 804 accesses the requested files that make up initial web page 802, including HTML code file 806, and transmits the files via the Internet 108 to browser 102. Browser 102 generates display 106 representing initial web page 802.

In step 704 of FIG. 7, the user selects a data mining function by activating a control, such as a button, displayed in initial web page 802. Activation of the control activates data mining tag 808, which is an HTML tag that is included in HTML code 806. Activation of data mining tag 808 causes information to be transmitted via the Internet 108 to server application 810 running on web server 110. In step 706, in response to receiving the information transmitted in response to activation of data mining tag 808, server application 810 launches and runs servlet 812.

Servlet 812 is a type of server program that runs within the environment of server application 810. A servlet is analogous to an applet running in the environment of a browser application. An applet is a program designed to be executed from within another application. Unlike an application, applets typically cannot be executed directly from the operating system. A well designed applet can be invoked from many different applications. Because applets are small in file size, cross-platform compatible, and highly secure, they are ideal for small Internet applications accessible from a browser.

Typically, applets and servlets are written using the JAVA® (Java) programming language. Java is high-level programming language developed by SUN MICROSYSTEMS®. Java is an object-oriented language similar to C++, but simplified to eliminate language features that cause common programming errors. Java source code files (files with a java extension) are compiled into a format called bytecode (files with a class extension), which can then be executed by a Java interpreter. Compiled Java code can run on most computers because Java interpreters and runtime environments, known as Java Virtual Machines (VMs), exist for most operating systems, including UNIT, the APPLE MACINTOSH OS®, and MICROSOFT WINDOWS®. Bytecode can also be converted directly into machine language instructions by a just-in-time compiler (JIT).

Java is a general purpose programming language with a number of features that make the language well suited for use on the World Wide Web. Small Java applications are called Java applets and can be downloaded from a Web server and run on a computer by a Java-compatible Web browser, such as NETSCAPE NAVIGATOR® or MICROSOFT INTERNET EXPLORER®.

A servlet is essentially an applet that runs on a server. The term typically refers to a Java applet that runs within a Web server environment. This is analogous to a Java applet that runs within a Web browser environment. Java servlets are becoming increasingly popular as an alternative to Common Gateway Interface (CGI) programs. The biggest difference between the two is that a Java servlet or applet is persistent. This means that once it is started, it stays in memory and can fulfill multiple requests. In contrast, a CGI program disappears once it has fulfilled a request. The persistence of Java servlets or applets makes them faster because there is no wasted time in setting up and tearing down the process.

Typically, servlet 810 runs in a servlet environment, such as JAVA SERVER PAGES® (JSP). A server-side technology, Java Server Pages are an extension to the Java servlet technology. JSPs have dynamic scripting capability that works in tandem with HTML code, separating the page logic from the static elements—the actual design and display of the page. Embedded in the HTML page, the Java source code and its extensions help make the HTML more functional, being used in dynamic database queries, for example. JSPs are not restricted to any specific platform or server.

In one embodiment, servlet 810 is implemented as a JAVABEAN®. JavaBeans are reusable software components written in Java. There is a JavaBean specification that defines how Java objects interact. An object that conforms to this specification is called a JavaBeans, and can be used by any application that understands the JavaBeans format. They can be used visually to create graphical user interfaces, like Swing, or non-visually with server-side Java programs like JavaServer Pages. JavaBeans typically perform intraprocess communication.

In this embodiment, predefined Web-enabled JavaBeans, termed WebBeans, may be provided to a developer of a Web server application. The WebBeans may be used in JSP pages. Typically, the WebBeans are visual components that the developer can used to output HTML directly from the WebBean. The WebBeans have access to the HttpRequest and HttpResponse objects of the JSP page and may be used to generate content dynamically.

Data mining, or other data collection functions, may be implemented by adding HTML tags, such as an img tag, to a Web page. The HTML tag sends a request to a servlet, or making the call to the servlet in the JSP page itself using a data mining or data collection WebBean.

In this embodiment of the present invention, data mining tag 808, which is an HTML tag that is included in HTML code 806, invokes servlet 812, which implements a data mining function. In this embodiment, servlet 812 is implemented as one or more WebBeans, such as WebBean 814 or WebBean 816. In other words, servlet 812 is implemented using Java code that has been written by a developer of the servlet. The Java code is written in a format that makes it self-contained and reusable—the JavaBean format. WebBeans 814 and 816 are JavaBeans that implement the data mining function by accessing data mining engine 114 during execution of servlet 812 to perform the necessary data mining processing. The Java code may include calls to the Java API in order to access data mining engine 114. WebBeans 814 and 816 illustrate two different implementations of WebBeans. WebBean 814 is implemented as a separate software object that is compiled or interpreted to generate servlet 812. WebBean 816 is implemented as an object in Java Server Page 818 and is also compiled or interpreted to generate servlet 812.

This embodiment requires that calls that invoke the WebBeans be inserted into the code at development time. This provides the developer with significant control and flexibility over the appearance and function of the display that is ultimately generated, at the cost of adding some complexity to the development process. Of course, this added complexity is still significantly less than would be added without the use of the WebBeans or other technique.

In another embodiment of the present invention, JSP tags, such as JSP tag 820 are used instead of WebBeans. In this embodiment, invocation of the servlet is performed by calling the JSP tag, which then invokes the servlet. The JSP tags interface is defined by using extensible markup language (XML). The developer of the HTML code may simply have HTML code 806 refer to JSP tag 820 and set the relevant properties. On the output side, the HTML developer may navigate through the XML output and decide what to display to the browser.

JSP tags provide a flexible level of integration between the Java developer and the HTML developer. The HTML developer can utilize tag libraries that return data mining information, which can be manipulated prior to display as HTML. Tags can support data mining, such as recommendations, as well as data collection. The use of JSP tags provides reduced, but still significant flexibility, with less complexity, as compared to the WebBeans embodiment.

Thus, in step 708, shown in FIG. 7, servlet 812 accesses data mining engine 114 and transmits to data mining engine 114 a request to perform data mining processing. Data mining engine 114 performs the requested data mining processing and generates data mining results 166, which are typically one or more predictions of future behavior and/or recommendations for future action. In step 710, HTML code for displaying the data mining results is generated from the data mining results 116. In one embodiment, data mining engine 114 may directly generate HTML code 822 that will control the display of data mining results 116. Alternatively, data mining results 116 may be transmitted to servlet 812 and servlet 812 will generate HTML code 824 for displaying the data mining results is generated from the data mining results 116.

In step 712, HTML code 822 or 824 is transmitted to browser 102 via the Internet 108. Browser 102 receives HTML code 822 or 824 and generates a data mining results page 826 based on the received HTML code 822 or 824. Browser 102 then generates a new or updated display 106 representing data mining results page 826.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing Internet data mining functionality comprising the steps of:
   transmitting to a browser operated by a user a Web page for display to the user, the Web page including a control for activating a data mining function;
   launching a servlet in response to an indication that the control has been activated;
   transmitting a request for data mining processing from the servlet to a data mining engine;
   receiving a result of the data mining processing from the data mining engine; and
   transmitting the result to the browser.

2. The method of claim 1, wherein the servlet is a reusable software component.

3. The method of claim 2, wherein the servlet is a JavaBean.

4. The method of claim 3 wherein the JavaBean comprises a call to a Java Application Program Interface.

5. The method of claim 2, wherein the servlet is launched using a Java Server Pages tag.

6. The method of claim 1, wherein activation of the control activates a Hypertext Markup Language tag.

7. The method of claim 1, wherein the result of the data mining processing comprises hypertext markup language code generated by the data mining engine.

8. The method of claim 1, further comprising the step of:
   generating Hypertext Markup Language code based on the received result of the data mining processing.

9. A computer program product for providing Internet data mining functionality in an electronic data processing system, comprising:
   a computer readable medium;
   computer program instructions, recorded on the computer readable medium, executable by a processor, for implementing the steps of:
   transmitting to a browser operated by a user a Web page for display to the user, the Web page including a control for activating a data mining function;
   launching a servlet in response to an indication that the control has been activated;
   transmitting a request for data mining processing from the servlet to a data mining engine;
   receiving a result of the data mining processing from the data mining engine; and
   transmitting the result to the browser.

10. The computer program product of claim 9, wherein the servlet is a reusable software component.

11. The computer program product of claim 10, wherein the servlet is a JavaBean.

12. The computer program product of claim 11 wherein the JavaBean comprises a call to a Java Application Program Interface.

13. The method of claim 10, wherein the servlet is launched using a Java Server Pages tag.

14. The computer program product of claim 9, wherein activation of the control activates a Hypertext Markup Language tag.

15. The computer program product of claim 9, wherein the result of the data mining processing comprises hypertext markup language code generated by the data mining engine.

16. The computer program product of claim 9, further comprising the step of:
   generating Hypertext Markup Language code based on the received result of the data mining processing.

17. A system for providing Internet data mining functionality comprising:
   a processor operable to execute computer program instructions; and
   a memory operable to store computer program instructions executable by the processor, the computer program instructions for performing the steps of:
   transmitting to a browser operated by a user a Web page for display to the user, the Web page including a control for activating a data mining function;
   launching a servlet in response to an indication that the control has been activated;
   transmitting a request for data mining processing from the servlet to a data mining engine;
   receiving a result of the data mining processing from the data mining engine; and
   transmitting the result to the browser.

18. The system of claim 17, wherein the servlet is a reusable software component.

19. The system of claim 18, wherein the servlet is a JavaBean.

20. The system of claim 19 wherein the JavaBean comprises a call to a Java Application Program Interface.

21. The system of claim 18, wherein the servlet is launched using a Java Server Pages tag.

22. The system of claim 17, wherein activation of the control activates a Hypertext Markup Language tag.

23. The system of claim 17, wherein the result of the data mining processing comprises hypertext markup language code generated by the data mining engine.

24. The system of claim 17, further comprising the step of:
   generating Hypertext Markup Language code based on the received result of the data mining processing.

* * * * *